W. NEIL.
Condensers and Refiners for Spirituous Liquors.
No. 138,517. Patented May 6, 1873.
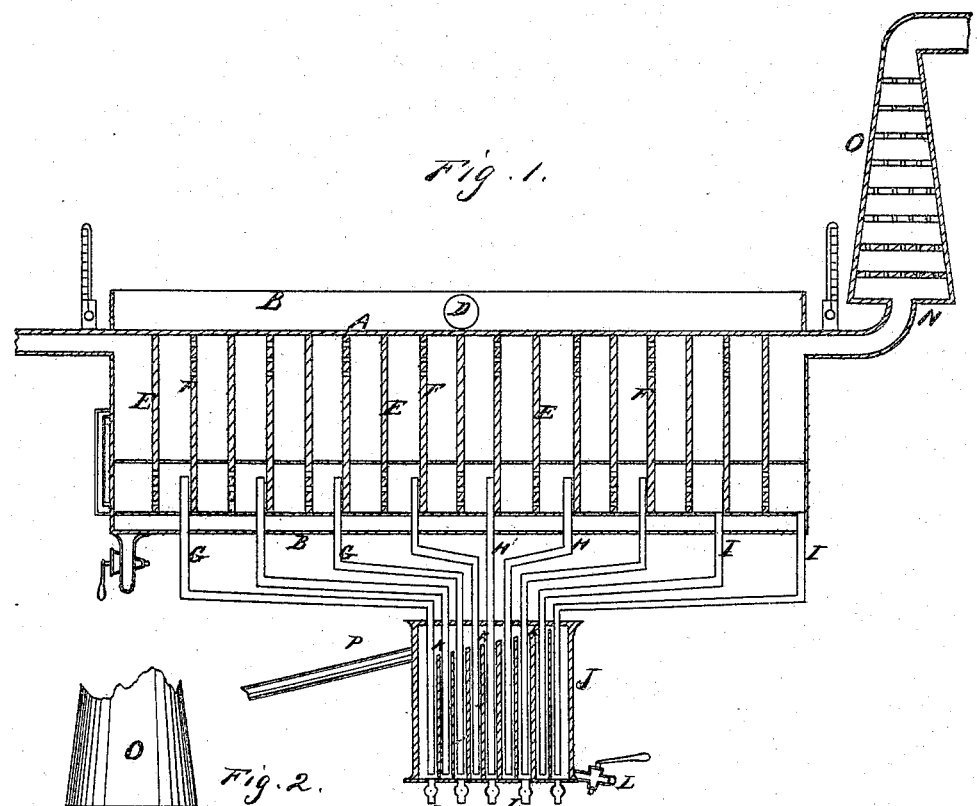
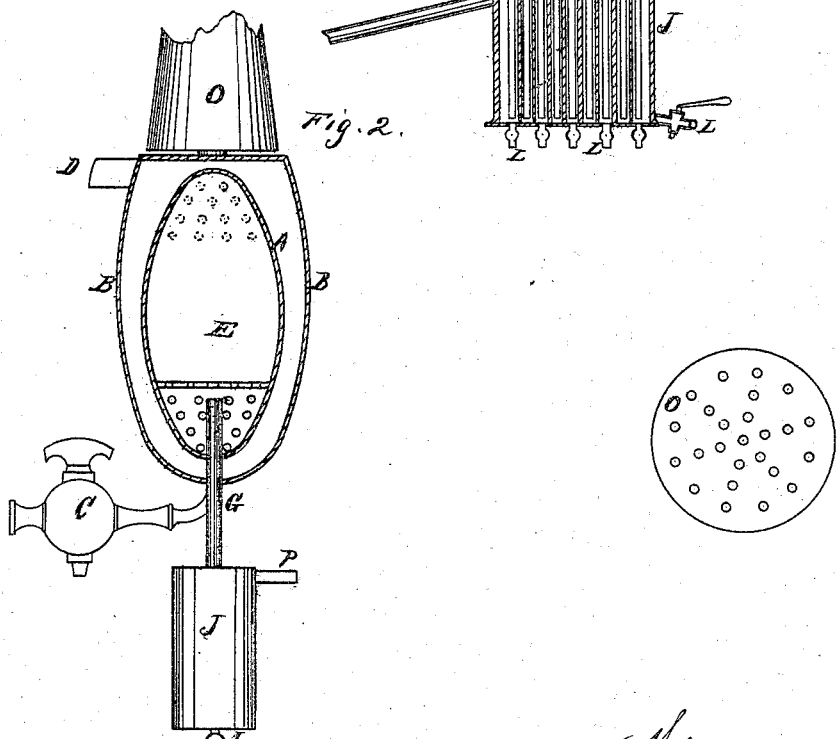

UNITED STATES PATENT OFFICE.

WILLIAM NEIL, OF SAN FRANCISCO, CALIFORNIA.

IMPROVEMENT IN CONDENSERS AND REFINERS FOR SPIRITUOUS LIQUORS.

Specification forming part of Letters Patent No. 138,517, dated May 6, 1873; application filed April 7, 1873.

*To all whom it may concern:*

Be it known that I, WILLIAM NEIL, of San Francisco city and county, State of California, have invented an Improved Refiner for Distilling Apparatus; and I do hereby declare the following description and accompanying drawing are sufficient to enable any person skilled in the art or science to which it most nearly appertains to make and use my said invention or improvement without further invention or experiment.

The object of my invention is to provide an improved refiner to be used in connection with any distilling apparatus for spirituous liquors; and it consists mainly in a novel cónstruction of an elongated vessel having diaphragms placed across it at intervals. These diaphragms are perforated alternately at the top and bottom for the passage of the vapors. Each compartment thus formed has a pipe leading out of it into a corresponding compartment in another vessel below. These compartments are so arranged that the different products, previously separated in the upper vessel, may be drawn off at once, or they may be allowed to overflow from one compartment to the other until all the impurities are thoroughly washed out, and the whole can then be returned to the still for a further elimination of spirituous vapors in case the process should not have been thorough. The vapors which pass out of the refining-vessel are those of the purified liquor, and are led through a distributing-vessel to the condenser.

Referring to the accompanying drawing for a more comple explanation of my invention, Figure 1 is a horizontal section of my refiner. Fig. 2 is a transverse section.

A is an elongated vessel having an elliptical transverse section, as shown. This vessel is surrounded by another vessel, B, and the space between the two is kept full of water by means of a pipe and cock, C. An overflow-pipe, D, serves to discharge the water, and thus a constant circulation is kept up, thereby cooling the vessel and contents. The vessel A has numerous partitions E F placed transversely across it, and these partitions are perforated, as shown, those marked E having perforations near the bottom, while those marked F have perforations near the top, so that any vapor will pass alternately through the lower and upper perforations. Pipes G H I pass out from the bottom of each of the chambers formed by the partitions, and these pipes, except those marked I, arise, so that their upper ends open at the height of the perforations in the partitions E. These pipes lead downward and are bent so as to lead into a vessel, J, below. This vessel has also partitions K separating it into chambers, into each of which a pipe leads. Cocks L are suitably placed for drawing off from each chamber, if desired; but if not desired, the partitions are so arranged that each partition from the left, for example, is a little higher than the one preceding it, so that the contents of the last chamber shall overflow into the next, and so on to the first, from which the whole will be carried back into the still.

The operation will be as follows: The vaporous products from the still are brought into the vessel A near the top at one end, as shown, by the pipe M; thence the vapors pass to the bottom and through the perforations in the partition E; thence up and through the perforations in the partition F, and so on to the end of the vessel. After running a short time the lower part of each chamber will be filled with the products of condensation to the height of the pipe G or H, and also to the height of the perforations. Through this the vapors must pass before reaching the perforations. Within the first chambers the heavier oils and impurities will be condensed while the more watery vapor will pass onto the other chambers. The pipes G will carry off the heavier impurities to the chambers below, while those marked H will take a lighter class. The pipes I are made to open flush with the bottom of the last two chambers in order to carry off all of the residue which is nearly pure watery vapor. The spirituous vapors will pass off through the pipe N at the top of the last chamber, and thence they pass through the vessel O, which is provided with perforated partitions or flows for the purpose of retarding and breaking up the flow of the vapor. From this vessel the vapors pass to the condenser. The condensed impurities and watery vapors from the different chambers in the vessel A flow through the pipes G, H, and I to their respective chambers in the vessel J. The purest or watery products from the pipes I, if not drawn off, will overflow their partition into the next chambers, each partition being successively lower than that preceding.

By this arrangement all the impurities are thoroughly washed out, and are then returned to the still by the pipe P from the first chamber, so that they can be worked over in case the whole of the valuable portion should not have been extracted by the first operation.

By this construction the whole apparatus is easily run and is easily kept clean, while the product is superior to that of ordinary stills.

Having thus described my invention, what I claim, and desire to secure by Letters Patent, is—

1. The vessel A, with its perforated partitions E and F, for directing and condensing the vapors, and forming chambers for holding the condensed products together with its inclosing water-jacket B, substantially as herein described.

2. In combination with the divided vessel A, the discharge-pipes G, H, and I, and the vessel J with its partitions K gradually increasing in height from first to last, substantially as and for the purpose herein described.

3. In combination with the refiner as herein shown, the peculiar discharge vessel or pipe N having perforated floors, substantially as and for the purpose herein described.

In witness whereof I hereunto set my hand and seal.

WILLIAM NEIL. [L. S.]

Witnesses:
   JOHN L. BOONE,
   C. M. RICHARDSON.